US012625754B2

(12) United States Patent
Chandrashekar et al.

(10) Patent No.: US 12,625,754 B2
(45) Date of Patent: May 12, 2026

(54) PERSONALIZED SERVICE DISRUPTION NOTIFICATION

(71) Applicant: Snowflake Inc., Bozeman, MT (US)

(72) Inventors: Samartha Chandrashekar, Bellevue, WA (US); Kaushal Y. Jain, Bellevue, WA (US); Carl Yates Perry, Burlingame, CA (US); Lian Yu, Foster City, CA (US); Xiaojun Zhao, Newark, CA (US)

(73) Assignee: Snowflake Inc., Bozeman, MT (US)

( * ) Notice: Subject to any disclaimer, the term of this patent is extended or adjusted under 35 U.S.C. 154(b) by 152 days.

(21) Appl. No.: 18/531,516

(22) Filed: Dec. 6, 2023

(65) Prior Publication Data

US 2025/0190294 A1 Jun. 12, 2025

(51) Int. Cl.
*G06F 11/00* (2006.01)
*G06F 11/07* (2006.01)

(52) U.S. Cl.
CPC ...... *G06F 11/0772* (2013.01); *G06F 11/0709* (2013.01)

(58) Field of Classification Search
CPC .......................... G06F 11/0772; G06F 11/0709
See application file for complete search history.

(56) References Cited

U.S. PATENT DOCUMENTS

2018/0309770 A1* 10/2018 Han ...................... G06N 20/00

OTHER PUBLICATIONS

AWS, "Amazon Redshift Service Level Agreement", [Online] Retrieved from the internet:https: aws.amazon.com redshift sla , (Nov. 1, 2023), 4 pages.
Databricks, "Databricks Support Policy", Databricks Support and Documentation, https: www.databricks.com support?_gl=1*1omxvre*_gc1_au*NjlxMjA0NzcuMTY4NzgyNDM4OA..*_ga*MTEwOTA1MzA3Ny4xNjg3ODI0Mzg4*_ga_PQSEQ3RZQC*MTY5MDMzMzAxMC4xLjAuMTY5MDMzMzAxMC42MC4wLjA.and_ga=2.2098, (Accessed on Nov. 19, 2025), 9 pages.
Google Cloud, "BigQuery Service Level Agreement (SLA)", Google Cloud Terms Directory, (Mar. 2023), 5 pages.
Snowflake, "Current Snowflake Status", [Online] Retrieved from the internet:https: status.snowflake.com , (Accessed on Nov. 19, 2025), 3 pages.
Snowflake, "Support Policy and Service Level Agreement", (Mar. 10, 2025), 9 pages.

* cited by examiner

*Primary Examiner* — Amine Riad

(74) *Attorney, Agent, or Firm* — Schwegman Lundberg & Woessner, P.A.

(57) ABSTRACT

Systems and methods are provided for generating personalized service disruption notifications. The system allocates resources of a database system to a plurality of entities, the resources of the database system being distributed in a cloud environment and analyzes a plurality of signals on the database system. The system, in response to analyzing the plurality of signals, detects a likelihood of a service availability disruption on the database system for a first entity of the plurality of entities. The system notifies the first entity of the service availability disruption in response to detecting the likelihood of the service availability disruption.

30 Claims, 8 Drawing Sheets

*FIG. 1*

500

510                 520                 530

| FEATURE NAME | FEATURE DESCRIPTION (FULL) | RELATIVE IMPORTANCE |
|---|---|---|
| DEP_INCIDENTS | THE NUMBER OF QUERY RELATED INCIDENTS IN A DEPLOYMENT IN THE LAST 5 MINUTES. | 1 |
| DUR_QUEUED_RESUMING_60M | THE DURATION FOR WHICH QUERIES HAD TO WAIT FOR A HIBERNATING WAREHOUSE TO RESUME IN THE LAST 60 MINUTES. | 0.7482 |
| QUEUED_JOBS_RATIO | THE QUEUED JOB PERCENTAGE (WRT TOTAL JOBS) IN THE LAST 5 MINUTES. | 0.6670 |
| VALID_OPERATIONS_RATIO | VALID QUERIES SUCCESS RATE (FOR THE ONES THAT ARE REGISTERED) | 0.6130 |
| VALID_OPERATIONS_60M | TOTAL NUMBER OF VALID QUERIES THAT ARE SUBMITTED BY THE CUSTOMER AND REGISTERED IN THE PAST 60 MINUTES. | 0.5688 |
| DUR_QUEUED_RESUMING | THE DURATION FOR WHICH QUERIES HAD TO WAIT FOR A HIBERNATING WAREHOUSE TO RESUME IN THE LAST 5 MINUTES. (TOTAL WAIT ACROSS ALL QUERIES) | 0.5242 |
| AVG_TOTAL_DURATION_60M | THE AVERAGE DURATION OF VALID QUERIES IN THE PAST 60 MINUTES. | 0.5092 |
| DEP_FAILED_OPERATION_30M | TOTAL NUMBER OF FAILED QUERIES/JOBS IN THE 30 MINUTES FOR A DEPLOYMENT. | 0.4476 |
| QUEUED_JOBS_30M | NUMBER OF VALID QUERIES / JOBS IN THE PAST 30 MINUTES THAT ARE WAITING TO | 0.4122 |
| | BE EXECUTED (BUT REGISTERED) | |
| QUEUED_JOBS_60M | NUMBER OF QUERIES / JOBS IN THE PAST 60 MINUTES THAT ARE WAITING TO BE EXECUTED (BUT REGISTERED) | 0.3894 |
| AVG_TOTAL_DURATION | THE AVERAGE DURATION OF VALID QUERIES IN THE LAST 5 MINUTES. | 0.3354 |
| AVG_TOTAL_DURATION_10M | THE AVERAGE DURATION OF VALID QUERIES IN THE LAST 10 MINUTES. | 0.3142 |
| DEP_USER_VISIBLE_INCIDENTS | TOTAL NUMBER OF QUERY RELATED INCIDENTS THAT ARE VISIBLE TO USERS IN A DEPLOYMENT | 0.3105 |
| VALID_OPERATIONS_30M | TOTAL NUMBER OF VALID QUERIES THAT ARE SUBMITTED BY THE CUSTOMER AND REGISTERED IN THE PAST 30 MINUTES. | 0.2679 |
| DEP_AVG_TOTAL_DURATION_10M | THE AVERAGE DURATION OF VALID QUERIES IN THE PAST 10 MINUTES FOR A DEPLOYMENT | 0.2623 |
| VALID_OPERATIONS | NUMBER OF VALID QUERIES THAT ARE SUBMITTED BY THE CUSTOMER AND ARE REGISTERED | 0.2520 |
| QUEUED_JOBS | NUMBER OF VALID QUERIES / JOBS IN THAT ARE WAITING TO BE EXECUTED (BUT REGISTERED) IN THE LAST 5 MINUTES. | 0.2259 |
| DEP_FAILED_OPERATIONS_60M | TOTAL NUMBER OF FAILED QUERIES/JOBS IN THE DEPLOYMENT LEVEL FOR THE PAST 60 MINUTES | 0.1692 |
| DEP_AVG_TOTAL_DURATION | THE AVERAGE DURATION OF VALID QUERIES IN A DEPLOYMENT IN THE LAST 5 MINUTES | 0.1083 |

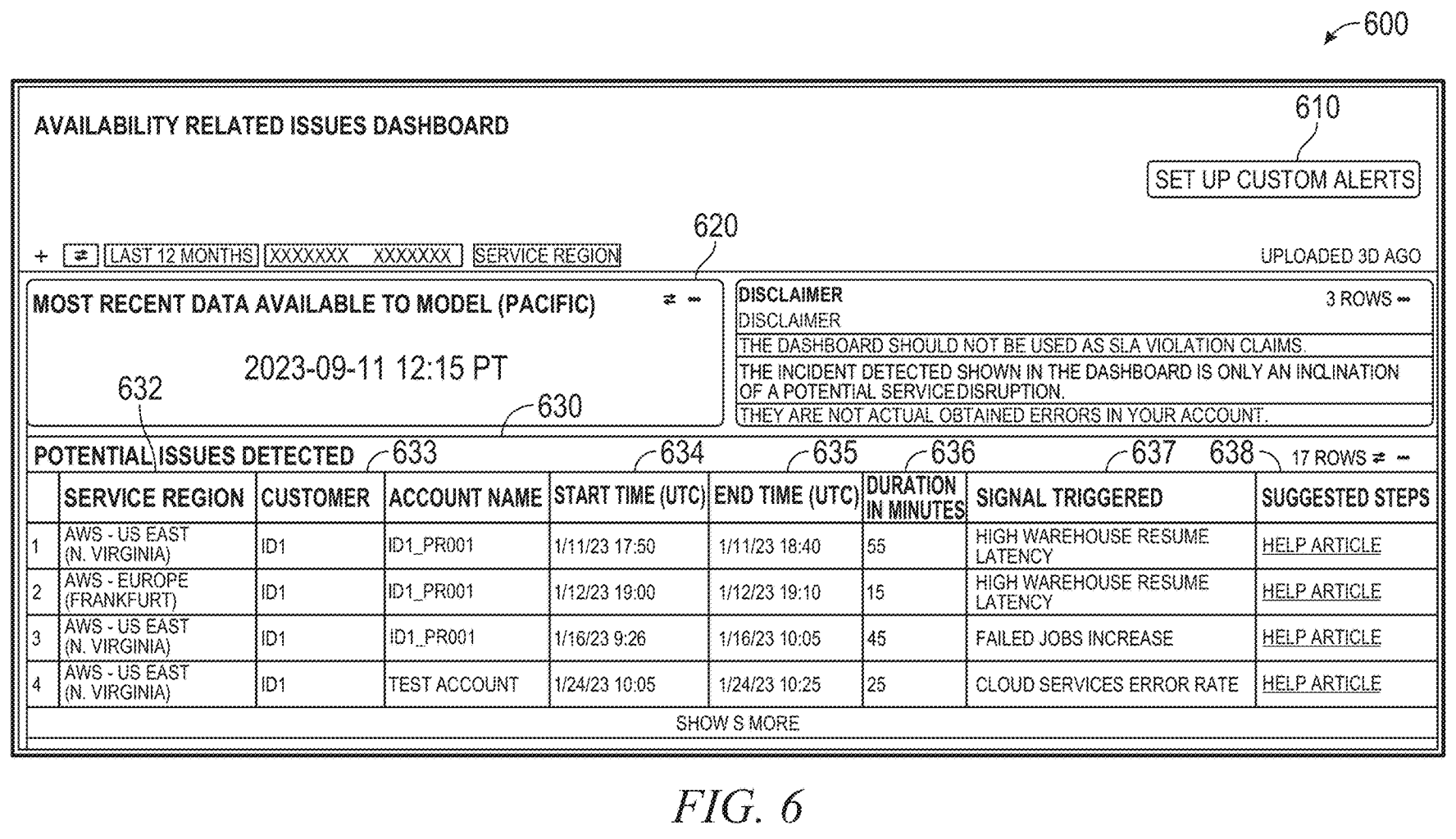

AVAILABILITY RELATED ISSUES DASHBOARD

[ SET UP CUSTOM ALERTS ]  610

+ | [≠] [LAST 12 MONTHS] [XXXXXXX] [XXXXXXX] [SERVICE REGION]

MOST RECENT DATA AVAILABLE TO MODEL (PACIFIC)   620   ≠ ⋯

UPLOADED 3D AGO 2023-09-11 12:15 PT   632   630

DISCLAIMER
DISCLAIMER
THE DASHBOARD SHOULD NOT BE USED AS SLA VIOLATION CLAIMS.
THE INCIDENT DETECTED SHOWN IN THE DASHBOARD IS ONLY AN INCLINATION
OF A POTENTIAL SERVICE DISRUPTION.
THEY ARE NOT ACTUAL OBTAINED ERRORS IN YOUR ACCOUNT.

3 ROWS ⋯

POTENTIAL ISSUES DETECTED   633   634   635   636   637   638   17 ROWS ≠ ⋯

| | SERVICE REGION | CUSTOMER | ACCOUNT NAME | START TIME (UTC) | END TIME (UTC) | DURATION IN MINUTES | SIGNAL TRIGGERED | SUGGESTED STEPS |
|---|---|---|---|---|---|---|---|---|
| 1 | AWS - US EAST (N. VIRGINIA) | ID1 | ID1_PR001 | 1/11/23 17:50 | 1/11/23 18:40 | 55 | HIGH WAREHOUSE RESUME LATENCY | HELP ARTICLE |
| 2 | AWS - EUROPE (FRANKFURT) | ID1 | ID1_PR001 | 1/12/23 19:00 | 1/12/23 19:10 | 15 | HIGH WAREHOUSE RESUME LATENCY | HELP ARTICLE |
| 3 | AWS - US EAST (N. VIRGINIA) | ID1 | ID1_PR001 | 1/16/23 9:26 | 1/16/23 10:05 | 45 | FAILED JOBS INCREASE | HELP ARTICLE |
| 4 | AWS - US EAST (N. VIRGINIA) | ID1 | TEST ACCOUNT | 1/24/23 10:05 | 1/24/23 10:25 | 25 | CLOUD SERVICES ERROR RATE | HELP ARTICLE |

SHOW 5 MORE

*FIG. 6*

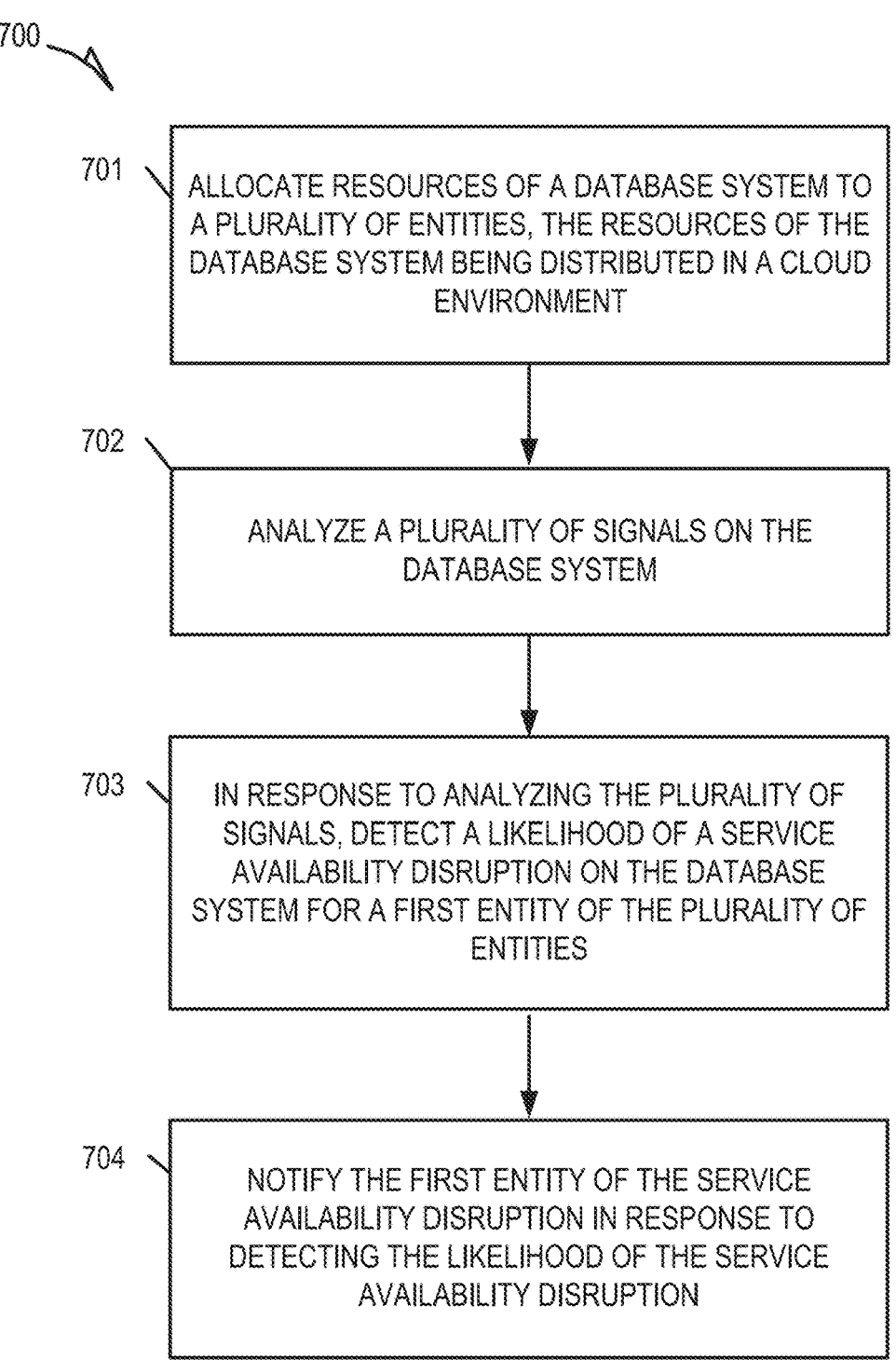

700

701 — ALLOCATE RESOURCES OF A DATABASE SYSTEM TO A PLURALITY OF ENTITIES, THE RESOURCES OF THE DATABASE SYSTEM BEING DISTRIBUTED IN A CLOUD ENVIRONMENT

702 — ANALYZE A PLURALITY OF SIGNALS ON THE DATABASE SYSTEM

703 — IN RESPONSE TO ANALYZING THE PLURALITY OF SIGNALS, DETECT A LIKELIHOOD OF A SERVICE AVAILABILITY DISRUPTION ON THE DATABASE SYSTEM FOR A FIRST ENTITY OF THE PLURALITY OF ENTITIES

704 — NOTIFY THE FIRST ENTITY OF THE SERVICE AVAILABILITY DISRUPTION IN RESPONSE TO DETECTING THE LIKELIHOOD OF THE SERVICE AVAILABILITY DISRUPTION

*FIG. 7*

PERSONALIZED SERVICE DISRUPTION NOTIFICATION

TECHNICAL FIELD

Examples of the disclosure relate generally to data platforms and databases and, more specifically, to predicting service disruptions on the databases.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed. Various operations performed on a database, such as joins and unions, involve combining query results obtained from different data sources (e.g., different tables, possibly on different databases) into a single query result. The accuracy and efficiency at which various operations can be performed are impacted by the schema associated with various rows/columns of the tables.

BRIEF DESCRIPTION OF THE DRAWINGS

The present disclosure will be understood more fully from the detailed description given below and from the accompanying drawings of various embodiments of the disclosure.

FIG. 1 illustrates an example computing environment that includes a network-based data platform, in accordance with some examples of the present disclosure.

FIG. 5 is an illustrative set of signals analyzed by the service disruption detection system, in accordance with some examples of the present disclosure.

FIG. 6 is an illustrative output of the service disruption detection system, in accordance with some examples of the present disclosure.

FIG. 7 is a flow diagram illustrating operations of the service disruption detection system, in accordance with some examples of the present disclosure.

DETAILED DESCRIPTION

Figure 2:
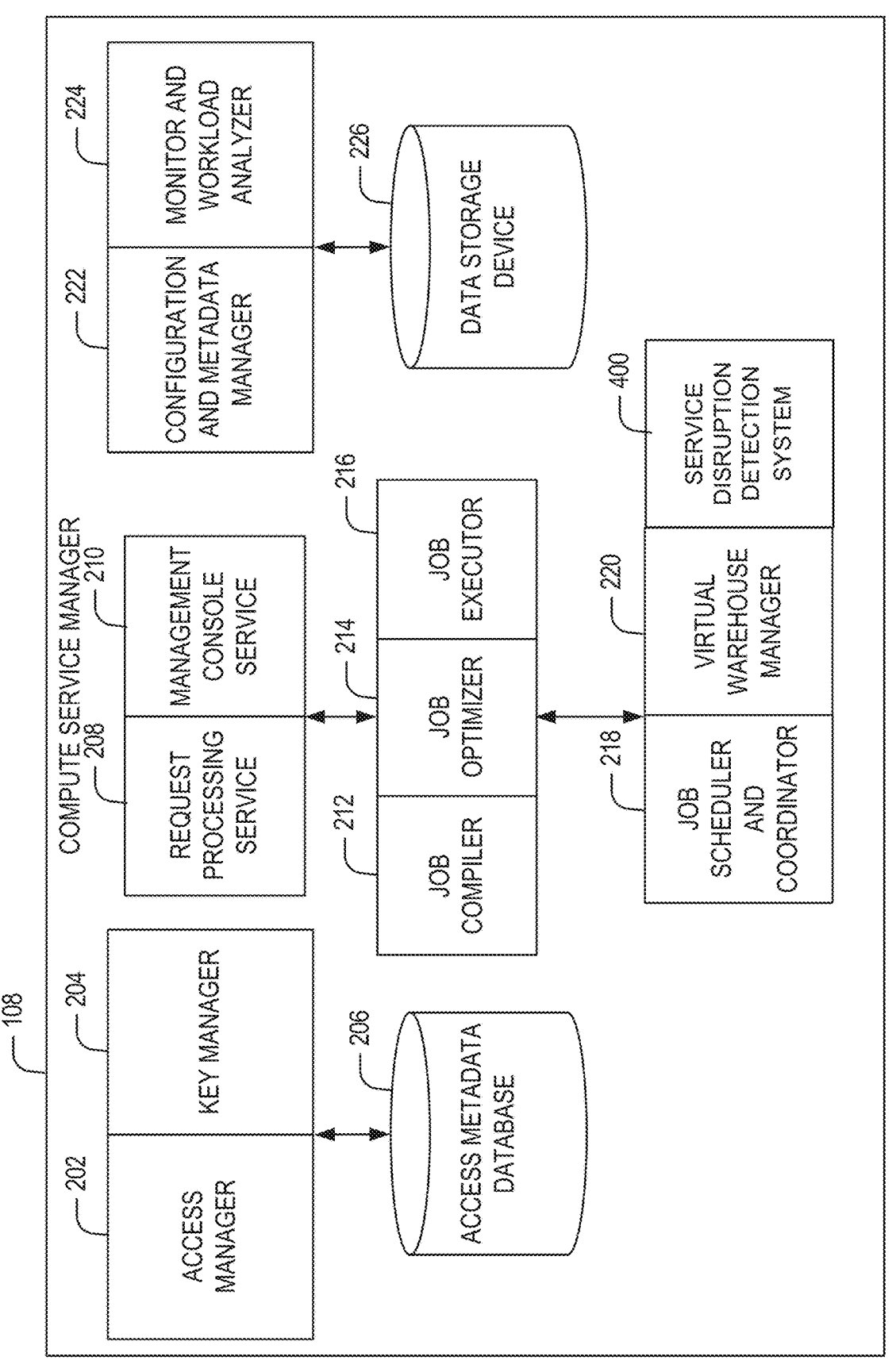
FIG. 2 is a block diagram illustrating components of a compute service manager, in accordance with some examples of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. The data platform may include one or more databases that are respectively maintained in association with any number of customer accounts (e.g., entities), as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well. The entities that are allocated services on the data platform may be third-parties relative to an entity that provides or hosts the data platform.

Users and/or executing processes that are associated with a given customer account may, via one or more types of clients, be able to cause data to be ingested into the database, and may also be able to manipulate the data, add additional data, remove data, run queries against the data, generate views of the data, and so forth. In an example implementation of a data platform, a given database is represented as an account-level object within a customer account, and the customer account may also include one or more other account-level objects such as users, roles, and/or the like. Furthermore, a given account-level database object may itself contain one or more objects such as tables, schemas, views, streams, tasks, and/or the like.

A given table may be organized as records (e.g., rows or a collection of rows) that each include one or more attributes (e.g., columns). A data platform may physically store database data in multiple storage units, which may be referred to as blocks, micro-partitions, and/or by one or more other names. In an example, a column of a database can be stored in a block and multiple blocks can be grouped into a single file. That is, a database can be organized into a set of files where each file includes a set of blocks. Consistent with this example, for a given column, all blocks are stored contiguously and blocks for different columns are row aligned. Data stored in each block can be compressed to reduce its size. A block storing compressed data may also be referred to as a "compression block" herein. As referred to herein, a "record" is defined as a collection of data (e.g., textual data) in a file that is organized by one or more fields, where each field can include one or more respective data portions (e.g., textual data, such as strings). Each field in the record can correspond to a row or column of data in a table that represents the records in the file. It should be understood that the terms "row" and "column" are used for illustration purposes and these terms are interchangeable. Data arranged in a column of a table can similarly be arranged in a row of the table.

In conventional systems, customers are provided with information on downtime or service disruptions on the data platform. This information is usually in very generic form and applies across the entire deployment of the data platform. The service disruption information does not provide sufficient details for customers to determine whether the service disruptions actually affect the services allocated to the individual customers or not. For example, the information can specify that there exists a service disruption in a particular region or portion of the data platform. However, because the data platform is implemented in a cloud environment, the customer is not informed about whether their services are currently running and implemented in the particular region or portion of the data platform that is subject to the service disruption. This causes a tremendous amount of confusion and is generally unhelpful. Also, if a customer relies on such information to reallocate its processes unnecessarily, resources and time end up being wasted.

Specifically, customers are more interested in learning about the impact of disruptions to their specific accounts and jobs rather than the overall service health across regions. Currently, customers fail to have a deterministic way of knowing if events published on a status page impact their accounts and resort to cutting support tickets to enquire about it. This approach results in a large number of false positives, spurious pages to their on-call staff, and suboptimal operational costs for using the data platform.

Aspects of the present disclosure include systems, methods, and devices to address, among other problems, the aforementioned shortcomings of conventional data platforms by personalizing notifications relating to service disruptions on a customer basis. Also, the customers can control the level of disruptions that trigger service disruption notifications to avoid being inundated with service disruption notifications. In this way, the data platforms can implement a multi-tenant database system and still provide individualized attention and notifications to customer accounts based on predicted likelihoods of service disruptions that may or may not impact those accounts.

The disclosed techniques provide customer-specific potential issue detection using a few key signals at a customer-account level (failures, error rates, latency, and so forth) to identify anomalies and infer the potential for an issue for specific accounts. The disclosed techniques use the annotated incident data to verify the coverage of the incidents (and detection of potentially non-annotated incidents). The disclosed techniques start with a simplistic model that can add more signals (failure rates, replication failures) to fine-tune thresholds based on testing at scale with more customers and incident data. In some cases, in order to get notified about a potential issue, customers have multiple options. The disclosed techniques enable the capability for customers to use the alerts and notifications framework to send email alerts on issues being triggered. Customers can configure custom tasks/procedures based on the changes to the issues. In addition, the disclosed techniques enable customers to send notifications to the queues of their choice/web-hooks/emails.

The disclosed techniques provide basic details such as issue duration, the key signal that was responsible for the potential issue, along with time-stamps and account/deployment information for the issue in a user interface to each customer. This provides a basic context for the customer to understand what triggered the issue. The disclosed techniques can add confidence/severity scores based on the signal strengths and time duration for the issues. In some cases, the signals that were gathered within a predefined time period in the past (e.g., the past 15 minutes of activity or past 1-2 minutes of activity) are analyzed to trigger notifications about potential service disruptions.

In some examples, the disclosed techniques allocate resources of a database system to a plurality of entities, the resources of the database system being distributed in a cloud environment, and analyze a plurality of signals on the database system. The disclosed techniques, in response to analyzing the plurality of signals, detect a likelihood of a service availability disruption on the database system for a first entity of the plurality of entities. The disclosed techniques notify the first entity of the service availability disruption in response to detecting the likelihood of the service availability disruption. By performing these operations, the data platform increases utilization of execution node processing capability and avoids waste of resources and inefficient use of resources.

FIG. 1 illustrates an example computing environment 100 that includes a data platform in the example form of a network-based data platform 102, in accordance with some examples of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other examples, the computing environment may comprise another type of network-based database system or a cloud data platform. For example, in some aspects, the computing environment 100 may include a cloud computing platform 101 with the network-based data platform 102, and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g., structured query language (SQL) queries, analysis), as well as other processing capabilities (e.g., parallel execution of sub-plans as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (e.g., one or more external storage locations). For example, a company could be a customer of a particular data platform and also separately maintain storage of any number of files be they unstructured files, semi-structured files, structured files, and/or files of one or more other types-on, as examples, one or more of their servers and/or on one or more cloud-storage platforms such as AMAZON WEB SERVICES™ (AWS™) MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform. The techniques described in this disclosure pertain to non-volatile storage devices that are used for the internal storage location and/or the external storage location.

From the perspective of the network-based data platform 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—e.g., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based data platform 102 of the cloud computing platform 101 is in communication with the cloud storage platforms 104 and 122 (e.g., Amazon Web Services (AWS)®, Microsoft Azure Blob Storage®, or Google Cloud Storage). The network-based data platform 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data platform 102.

The network-based data platform 102 comprises a compute service manager 108, an execution platform 110, and one or more metadata databases 112. The network-based data platform 102 hosts and provides data reporting and analysis services to multiple client accounts. The compute service manager 108 coordinates and manages operations of the network-based data platform 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user (entity) of one of the multiple client accounts (multiple entity accounts) supported by the network-based data platform 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 106, such as the Internet or a private network.

In the description below, actions are ascribed to users, particularly consumers, entities, and providers. Such actions shall be understood to be performed concerning client device (or devices) 114 operated by such users (also referred to as entities). For example, notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

In some examples, a user account object lists users authorized to access at least one target account (e.g., an account of a data provider or data consumer 115). In some examples, a roles account object configures privileges for the users to access the at least one target account. In some aspects, a warehouse object indicates compute resources (e.g., at least one virtual warehouse of the execution platform 110) for executing a workload associated with one or more databases of the data provider. In some examples, a resource monitor object configures monitoring usage of the compute resources.

The compute service manager 108 is also coupled to one or more metadata databases 112 that store metadata about various functions and aspects associated with the network-based data platform 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata.

Figure 3:
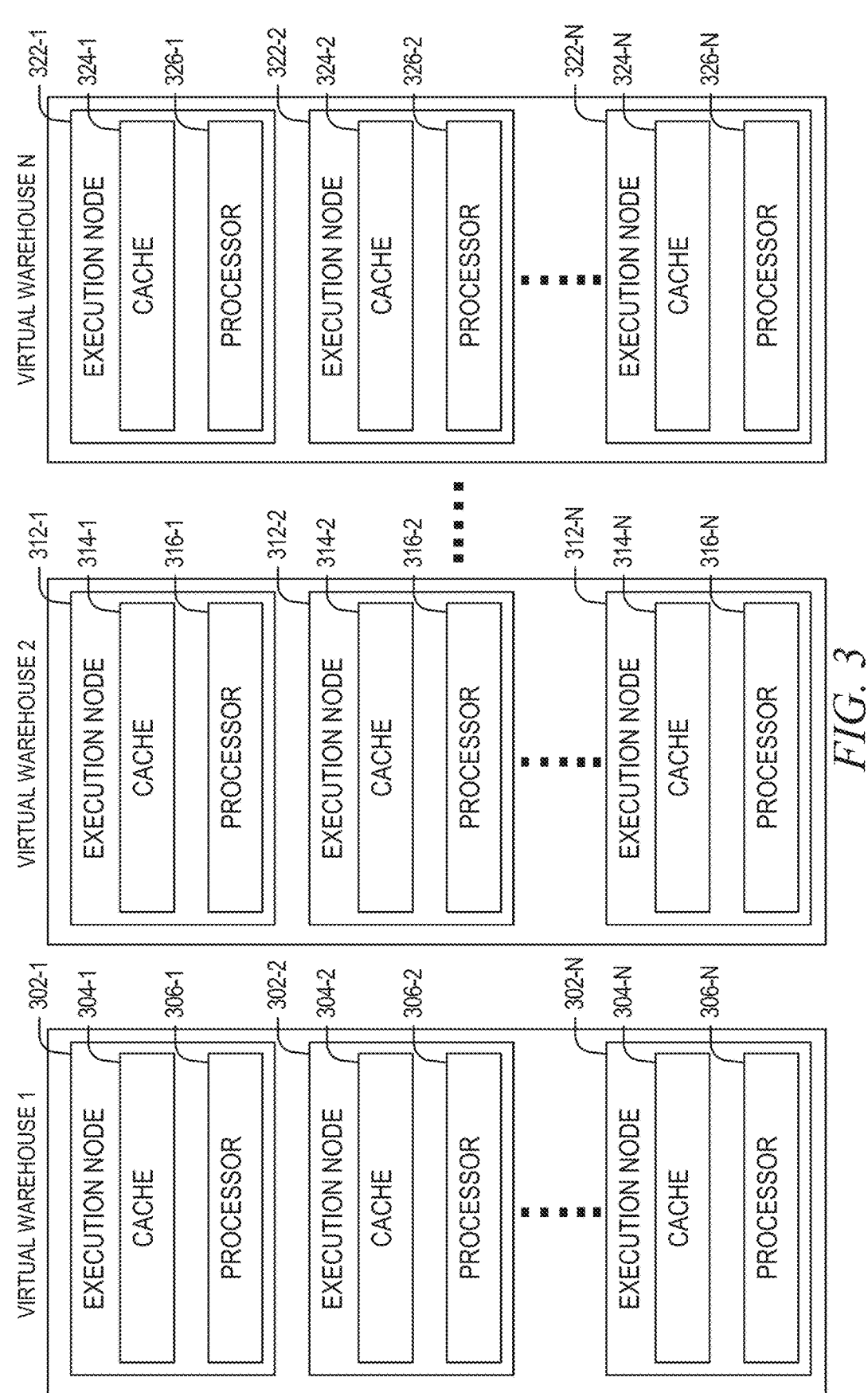
FIG. 3 is a block diagram illustrating components of an execution platform, in accordance with some examples of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ a storage systems, or any other data-storage technology. Additionally, the cloud storage platform 104 may include distributed file systems (such as Hadoop Distributed File Systems (HDFS)), object storage systems, and the like.

In some examples, at least one storage device cache 126 (e.g., an internal cache) may reside on one or more of the data storage devices 120-1-120-N, and at least one external stage 124 may reside on one or more of the cloud storage platforms 122. In some examples, a single storage device cache 126 can be associated with all of the data storage devices 120-1-120-N so that the single storage device cache 126 is shared by and can store data associated with any one of the data storage devices 120-1-120-N. In some examples, each data storage devices 120-1-120-N can include or implement a separate storage device cache 126. A cache manager 128 handles the transfer of data from the data storage devices 120-1-120-N to the storage device cache 126. The cache manager 128 handles the eviction of data from the storage device cache 126 to the respective associated data storage devices 120-1-120-N. The storage platform 104 can include one or more hard drives and/or can represent a plurality of hard drives distributed on a plurality of servers in a cloud computing environment.

In some examples, communication links between elements of the computing environment 100 are implemented via one or more data communication networks. These data communication networks may utilize any communication protocol and any type of communication medium. In some examples, the data communication networks are a combination of two or more data communication networks (or sub-networks) coupled to one another. In alternate examples, these communication links are implemented using any type of communication medium and any communication protocol.

The compute service manager 108, metadata database(s) 112, execution platform 110, and storage platform 104 are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based data platform 102. Thus, in the described examples, the network-based data platform 102 is dynamic and supports regular changes to meet the current data processing needs.

During a typical operation, the network-based data platform 102 processes multiple jobs (e.g., operators of sub-plans) determined by the compute service manager 108. These jobs (e.g., caller processes) are scheduled and managed by the compute service manager 108 to determine when and how to execute the job. For example, the compute service manager 108 may divide the job into multiple discrete tasks (e.g., caller processes) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task (e.g., in a storage device cache 126, such as an HDD cache or RAM) and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

According to various examples, the execution platform 110 executes a query according to a query plan determined by the compute service manager 108. As part of executing the query, the execution platform 110 performs a table scan in which one or more portions of a database table are scanned to identify data that matches the query. More specifically, the database table can be organized into a set of files where each file comprises a set of blocks (or records) and each block (or record) stores at least a portion of a column (or row) of the database. Each execution node provides multiple threads of execution, and in performing a table scan, multiple threads perform a parallel scan of the set of blocks (or records) of a file, which may be selected from a scan set corresponding to a subset of the set of files into which the database is organized.

The cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

In some examples, the execution platform 110 maintains a job table. The job table can list which jobs are being executed for which users (also referred to as clients or entities). The job table can associate an identifier of each user with a list of jobs being executed or scheduled to be executed for that user. The job table can maintain various job information including signals, parameters, metrics, and/or statistics for each job being executed. Any portion of the job information can be processed to predict, estimate, or generate a likelihood that a given user will experience a service disruption. The likelihood can be associated or represent a region or portion of the execution platform 110 that is potentially subject to service disruption that adversely impacts a certain set of entities or users of the execution platform 110. Any user that is not impacted by the service disruption may not be notified about the potential service disruption while users that are impacted are notified.

FIG. 2 is a block diagram illustrating components of the compute service manager 108, in accordance with some examples of the present disclosure. As shown in FIG. 2, the compute service manager 108 includes an access manager 202 and a credential management system (or key manager) 204 coupled to an access metadata database 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices," "non-volatile storage devices," "cloud storage devices," or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110, in a storage device cache 126, or in a data storage device in storage platform 104.

A management console service 210 supports access to various systems and processes by administrators and other system managers. Additionally, the management console service 210 may receive a request to execute a job and monitor the workload on the system. The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an example, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some examples, the job scheduler and coordinator 218 identifies or assigns particular nodes in the execution platform 110 to process particular tasks, A virtual warehouse manager 220 manages the operation of multiple virtual warehouses implemented in the execution platform 110. For example, the virtual warehouse manager 220 may generate query plans for executing received queries by one or more execution nodes of the execution platform 110.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data platform 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based data platform 102. For example, data storage device 226 may represent buffers in execution platform 110, storage devices in storage platform 104, or any other storage device.

FIG. 3 is a block diagram illustrating components of the execution platform 110, in accordance with some examples of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing data from any of the data storage devices 120-1 to 120-N and their associated storage device cache 126 (e.g., via a respective lock file) shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some examples, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service, in other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some examples, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state. Each virtual warehouse can separately and independently host processes and allocate resources across multiple user accounts or multiple entities. In this way, each virtual warehouse can implement a multi-tenant data platform. In some cases, a first virtual warehouse can be associated with a first likelihood of service disruption while a second virtual warehouse can be associated with a second likelihood of service disruption. Certain user accounts to which resources of the first virtual warehouse are allocated can be notified about service disruptions if the first likelihood transgresses a specified threshold. Certain user accounts to which resources of the second virtual warehouse are allocated can be notified about service disruptions if the second likelihood transgresses the same or different specified threshold.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some examples, the caches are implemented using high-speed memory devices that provide fast access to the cached data. Each cache can store data from any of the storage devices in the cloud storage platform 104. The techniques described with respect to the cache manager 128 of the storage platform 104 (e.g., a HDD) can be similarly applied to the cache 304-N, 314-N, and 324-N of the execution nodes 302-N, 312-N, and 322-N.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some examples, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, . . . , N may be implemented using multiple computing systems at multiple geographic locations. For example, virtual warehouse 1 can be implemented by a computing system at a first geographic location, while virtual warehouses 2 and N are implemented by another computing system at a second geographic location. In some examples, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location. A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some examples, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
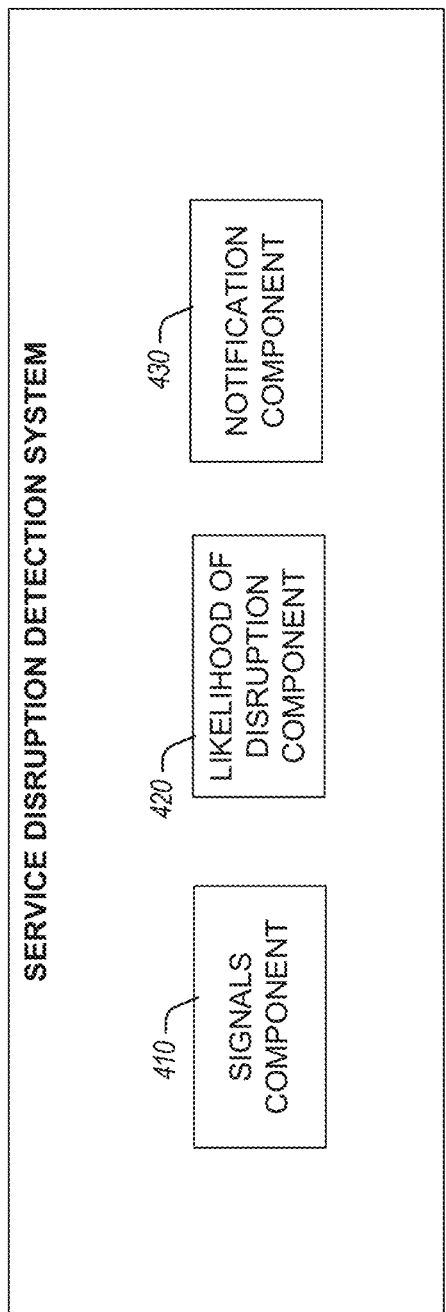
FIG. 4 is a block diagram of a service disruption detection system, in accordance with some examples of the present disclosure.

FIG. 4 is a block diagram illustrating an example of the service disruption detection system 400 which can be implemented by any of the virtual warehouses of the execution platform 110 (and/or by the compute service manager 108), in accordance with some examples of the present disclosure. The service disruption detection system 400 can include a signals component 410, a likelihood of disruption component 420, and a notification component 430. The service disruption detection system 400 is configured to allocate resources of a database system (e.g., the execution platform 110) to a plurality of entities; the resources of the database system can be distributed in a cloud environment. The service disruption detection system 400 analyzes a plurality of signals on the database system. The service disruption detection system 400, in response to analyzing the plurality of signals, detects a likelihood of a service availability disruption on the database system for a first entity of the plurality of entities. The service disruption detection system 400 notifies the first entity of the service availability disruption in response to detecting the likelihood of the service availability disruption.

In some examples, the signals component 410 generates a jobs table that provides jobs information for multiple entities across each component of the execution platform 110 (e.g., across each of the virtual warehouses). The signals component 410 can analyze and store various job information and associate such job information with each entity identified in the jobs table. For example, the jobs table can list entity identifiers and corresponding jobs for each entity identifier. The jobs can specify the virtual warehouse and/or region that is currently allocated to execute those particular jobs.

In some cases, the jobs information includes any one or combination of a number of query-related incidents within a first prior time interval, a duration for which queries were delayed waiting to be resumed within a second prior time interval, a queued job percentage in a third prior time interval, a valid queries success rate, a total number of valid queries submitted by an individual entity in the second prior time interval, the duration for which queries were delayed waiting to be resumed within a fourth prior time interval, an average duration of valid queries in a fifth prior time interval, a total number of failed queries in a sixth prior time interval, a number of queries waiting to be executed in a seventh prior time interval, a number of queries waiting to be executed in an eighth prior time interval, an average duration of valid queries in a ninth prior time interval, an average duration of valid queries in a tenth prior time interval, and/or a total number of query related incidents visible to one or more entities. Each job information can be assigned a relative importance that can be used to derive a likelihood of service disruption. The jobs information can be used to predict failure or service disruption on an entity-by-entity level.

In some examples, the signals component 410 accesses a jobs table to retrieve job information for each entity associated with the execution platform 110. The signals component 410 can retrieve the information from the jobs table periodically (e.g., every 5 minutes, 1-2 minutes, 60 minutes) or continuously. The signals component 410 can process job signals retrieved from the jobs table on an entity basis or collectively across multiple entities. For example, the signals component 410 can access the jobs table to derive various features. A subset of such features is shown in the features table 500 in FIG. 5. The features table 500 can include a feature name 510, a feature description 520, and a relative importance 530. The relative importance 530 is an example set of weights shown in FIG. 5 and any other suitable value can be computed/assigned to the respective features.

The signals component 410 provides the features table 500 to the likelihood of disruption component 420. The disruption component 420 can implement one or more machine learning models (e.g., convolutional neural networks) that process the features information for various entities (provided in the features table 500) to generate a prediction of a likelihood that specific entities will experience a service disruption. Namely, the machine learning model can analyze a plurality of signals that represent job status, success, and/or failure information across many of the virtual warehouses. The machine learning model can then detect a likelihood of a service availability disruption on the execution platform 110 for each respective entity (e.g., a first entity) of the plurality of entities.

For example, the machine learning model can output a table that includes an identifier of a region associated with the service availability disruption, an identifier of an individual entity affected by the service availability disruption, an estimated start time of the service availability disruption, an estimated end time of the service availability disruption, a likelihood score for the service availability disruption, and indication of one or more signals that cause the service availability disruption. This table can be presented by the notification component 430 to an entity that is affected by the service availability disruption.

In some examples, a set of training data is generated for training the machine learning model. To generate the set of training data, over time, a collection of signals is stored. The signals can be obtained from the jobs table and analyzed to generate ground truth likelihoods of service disruptions. For example, the training database signals can be generated by analyzing operations associated with a plurality of training entities on the database system. The ground truth likelihoods of service availability disruptions for the training database signals can be generated based on application of Mahalanobis distance and principal component analysis (PCA) to the training database signals. Once a sufficient amount of signals is gathered, the training data is stored and used to train the machine learning model.

In some examples, the machine learning model accesses the training data that associates training database signals associated with a plurality of training entities to which resources on the database system are allocated and corresponding ground truth likelihoods of service availability disruptions. The machine learning model processes a first batch of the training database signals to generate an estimated likelihood of service availability disruption. The machine learning model computes a deviation between the estimated likelihood of the service availability disruption and the corresponding ground truth likelihood of the service availability disruption associated with the first batch of the training database signals. The machine learning model then updates parameters of the machine learning model based on the deviation. The machine learning model then repeats these training operations for another batch of the training database signals until a stopping criterion is reached.

In some examples, the disruption component 420 obtains a likelihood of a service availability disruption for the first entity of the plurality of entities. The disruption component 420 obtains a threshold associated with the first entity. The threshold may have previously been set and stored by the first entity in a graphical user interface. This way different entities can specify different thresholds to control the level at which notifications are provided based on their own needs. The disruption component 420 compares the likelihood of service disruption associated with the first entity to the threshold associated with the first entity. The disruption component 420 determines whether the likelihood transgresses the threshold. In response to determining that the likelihood transgresses threshold, the disruption component 420 instructs the notification component 430 to trigger a notification for transmission to the first entity.

Similarly, the disruption component 420 can obtain a likelihood of a service availability disruption for a second entity of the plurality of entities. The disruption component 420 obtains a threshold associated with the second entity. The disruption component 420 compares the likelihood of service disruption associated with the second entity to the threshold associated with the second entity. The disruption component 420 determines whether the likelihood transgresses the threshold. In response to determining that the likelihood transgresses threshold, the disruption component 420 instructs the notification component 430 to trigger a notification for transmission to the second entity separately from the first entity. In this way individualized and personalized notifications about potential service disruptions can be triggered and provided to different entities that are allocated resources on the same execution platform 110.

FIG. 6 is an illustrative output of the service disruption detection system 400, in accordance with some examples of the present disclosure. For example, each entity or user of the execution platform 110 can independently and separately access a user interface 600, shown in FIG. 6, using a respective computing system. The user interface 600 is personalized to each entity. The user interface 600 can allow the entities to define the thresholds that are used to control whether to transmit notifications about upcoming or potential/predicted service disruptions to the respective entities. In some cases, if no thresholds are specified, a default threshold is associated with the entities until changed by the entity using the user interface 600.

For example, input can be received from a first entity that selects a set up custom alerts option 610. In response to receiving the input, a window or new user interface is presented. Additional input can be received from the computing device of the first entity that defines the threshold against which a likelihood of service disruption is compared in the window or new user interface. The threshold can be stored in association with the first entity. The disruption component 420 can use that threshold to determine whether or not to trigger a notification for presentation to the first entity when the machine learning model generates a prediction of a likelihood of service disruption associated with the first entity.

In some examples, the user interface 600 includes a region 620 that identifies a time when the data from the jobs table was accessed to generate the signals provided by the signals component 410 to the disruption component 420. Namely, the disruption component 420 can generate a prediction of a likelihood of service disruption based on signals collected by the signals component 410 at a time specified in the region 620. This may have happened a while or a certain period of time after the first entity is notified about the service disruption and after the first entity accesses the user interface 600. As such, the region 620 informs the first entity when the data was collected that caused the notification to be triggered.

The user interface 600 includes a detailed information region 630 that provides details about one or more predicted likelihoods of service disruptions. The detailed information region 630 can include a service region 632 that identifies which region of the execution platform 110 was identified by the machine learning model as being impacted by the service disruption based on the signals collected by the signals component 410. The detailed information region 630 includes a customer identifier field 633 that informs the first entity about which customer is impacted by the service disruption. In some cases, the customer identifier field 633 identifies the same entity that is currently accessing the user interface 600. The user interface 600 can include a start time field 634 that identifies the predicted start time generated by the machine learning model of the service disruption. Namely, the machine learning model can predict when the service disruption will start or when it was started and store that information for presentation in the start time field 634.

The user interface 600 can include an end time field 635 that identifies the predicted end time generated by the machine learning model of the service disruption. Namely, the machine learning model can predict when the service disruption will end or when it was ended and store that information for presentation in the end time field 635. The user interface 600 can include a duration field 636 that represents the total duration of the down time (e.g., the service disruption) generated by the machine learning model. This end time field 636 can be computed based on a difference between the start time field 634 and the end time field 635.

The user interface 600 can include a signal triggered field 637. The machine learning model can generate the likelihood of service disruption based on many different kinds of signals received from the signals component 410. The machine learning model (implemented by the disruption component 420) can select one or more signals from the multitude of signals received from the signals component 410 that are attributed to the greatest factor in determining the likelihood of service disruption. Those selected signals can be presented in the signal triggered field 637. This informs the first entity (or entity that is accessing the user interface 600) about the specific cause of the potential or imminent service disruption that is predicted by the machine learning model.

In some examples, another field (not shown) can be provided for each listed service disruption that specifies the numerical value of the likelihood of service disruption. This can allow the entity to assess whether the service disruption will be manifested or not. Rather than a numerical value, a critical level description can be presented to help guide the entity on the severity of the likelihood of service disruption. The user interface 600 can also include a suggested steps field 638 that indicates to the first entity what options exist for resolving the service disruption. For example, an option can be presented that allows the entity to reallocate the affected jobs to another virtual warehouse or reschedule the jobs for a future time. The user interface 600 can also include information indicating when the service allocated to the first entity will be restored following the predicted service disruption.

FIG. 7 is a flow diagram illustrating operations 700 of the service disruption detection system 400, in accordance with some examples of the present disclosure. The operations 700 may be embodied in computer-readable instructions for execution by one or more hardware components (e.g., one or more processors) such that the operations of the operations 700 may be performed by components of data platform 102 such as the execution platform 110. Accordingly, the operations 700 is described below, by way of example with reference thereto. However, it shall be appreciated that operations 700 may be deployed on various other hardware configurations and is not intended to be limited to deployment within the data platform 102. Depending on the example, an operation of the operations 700 may be repeated in different ways or involve intervening operations not shown. Though the operations of the operations 700 may be depicted and described in a certain order, the order in which the operations are performed may vary among examples, including performing certain operations in parallel or performing sets of operations in separate processes.

At operation 701, the service disruption detection system 400 allocates resources of a database system to a plurality of entities, the resources of the database system being distributed in a cloud environment, as discussed above.

At operation 702, the service disruption detection system 400 analyzes a plurality of signals on the database system, as discussed above.

At operation 703, the service disruption detection system 400, in response to analyzing the plurality of signals, detects a likelihood of a service availability disruption on the database system for a first entity of the plurality of entities, as discussed above.

At operation 704, the service disruption detection system 400 notifies the first entity of the service availability disruption in response to detecting the likelihood of the service availability disruption, as discussed above.

Described implementations of the subject matter can include one or more features, alone or in combination as illustrated below by way of example.

Example 1: A system comprising: at least one hardware processor; and at least one memory storing instructions that cause the at least one hardware processor to execute operations comprising: allocating resources of a database system to a plurality of entities, the resources of the database system being distributed in a cloud environment; analyzing a plurality of signals on the database system; in response to analyzing the plurality of signals, detecting a likelihood of a service availability disruption on the database system for a first entity of the plurality of entities; and notifying the first entity of the service availability disruption in response to detecting the likelihood of the service availability disruption.

Example 2. The system of Example 1, the operations comprising: computing the likelihood of the service availability disruption based on the plurality of signals; and triggering notifying the first entity in response to determining that the likelihood transgresses a threshold value.

Example 3. The system of any one of Examples 1-2, wherein the service availability disruption affects the first entity while services continue to be made available to a second entity of the plurality of entities, the first entity being notified without notifying the second entity.

Example 4. The system of any one of Examples 1-3, wherein the resources of the database system are allocated to the first entity on a first portion of the cloud environment, and wherein the resources of the database system are allocated to a second entity on a second portion of the cloud environment.

Example 5. The System of any One of Examples 1-4, Wherein the Plurality of Entities Comprises Third-Party Entities Relative to a Provider of the Database System.

Example 6. The system of any one of Examples 1-5, the operations comprising: storing a job table that associates a first plurality of job features with the first entity and a second plurality of job features with a second entity; and deriving the plurality of signals from the job table.

Example 7. The system of any one of Examples 1-6, the operations comprising: receiving input from a first computing system associated with the first entity that defines a first threshold for triggering service availability disruptions; and receiving input from a second computing system associated with a second entity that defines a second threshold for triggering service availability disruptions.

Example 8. The system of Example 7, wherein the first entity is notified in response to determining that the likelihood transgresses the first threshold, and wherein the second entity is notified about a service availability disruption in response to determining that another likelihood of a service availability disruption for the second entity transgresses the second threshold.

Example 9. The system of any one of Examples 1-8, the operations comprising: providing, as part of notifying the first entity about the service availability disruption, information indicating an approximate time to restore service for the first entity on the database system.

Example 10. The system of any one of Examples 1-9, the operations comprising: processing the plurality of signals by a machine learning model to predict the likelihood of the service availability disruption on the database system.

Example 11. The system of Example 10, wherein the machine learning model generates outputs comprising an identifier of a region associated with the service availability disruption, an identifier of an individual entity affected by the service availability disruption, an estimated start time of the service availability disruption, an estimated end time of the service availability disruption, a likelihood score for the service availability disruption, and indication of one or more signals of the plurality of signals that cause the service availability disruption.

Example 12. The system of any one of Examples 10-11, the operations comprising training the machine learning model by performing training operations comprising: accessing training data that associates training database signals associated with a plurality of training entities to which resources on the database system are allocated and corresponding ground truth likelihoods of service availability disruptions; processing, by the machine learning model, a first batch of the training database signals to generate an estimated likelihood of service availability disruption; computing a deviation between the estimated likelihood of the service availability disruption and the corresponding ground truth likelihood of the service availability disruption associated with the first batch of the training database signals; and updating parameters of the machine learning model based on the deviation.

Example 13. The system of Example 12, the operations comprising: generating the training database signals based on analyzing operations associated with the plurality of training entities on the database system; and computing the ground truth likelihoods of service availability disruptions for the training database signals based on application of Mahalanobis distance and principal component analysis (PCA) to the training database signals.

Example 14. The system of any one of Examples 1-13, wherein the plurality of signals comprises at least one of a number of query related incidents within a first prior time interval, a duration for which queries were delayed waiting to be resumed within a second prior time interval, a queued job percentage in a third prior time interval, a valid queries success rate, a total number of valid queries submitted by an individual entity in the second prior dine interval, the duration for which queries were delayed waiting to be resumed within a fourth prior time interval, an average duration of valid queries in a fifth prior time interval, a total number of failed queries in a sixth prior time interval, a number of queries waiting to be executed in a seventh prior time interval, a number of queries waiting to be executed in an eighth prior time interval, an average duration of valid queries in a ninth prior time interval, an average duration of valid queries in a tenth prior time interval, or a total number of query related incidents visible to one or more entities.

Example 15. The system of any one of Examples 1-14, the operations comprising: receiving, from a computing device of the first entity, a request from the first entity to access service availability disruptions; and in response to receiving the request, generating a graphical user interface comprising the likelihood of the service availability disruption for presentation on the computing device of the first entity.

Example 16. A method comprising: allocating, by one or more processors, resources of a database system to a plurality of entities, the resources of the database system being distributed in a cloud environment; analyzing a plurality of signals on the database system; in response to analyzing the plurality of signals, detecting a likelihood of a service availability disruption on the database system for a first entity of the plurality of entities; and notifying the first entity of the service availability disruption in response to detecting the likelihood of the service availability disruption.

Example 17. A computer-storage medium comprising instructions that, when executed by at least one processor of a machine, configure the machine to perform operations comprising: allocating resources of a database system to a plurality of entities, the resources of the database system being distributed in a cloud environment; analyzing a plurality of signals on the database system; in response to analyzing the plurality of signals, detecting a likelihood of a service availability disruption on the database system for a first entity of the plurality of entities; and notifying the first entity of the service availability disruption in response to detecting the likelihood of the service availability disruption.

Figure 8:
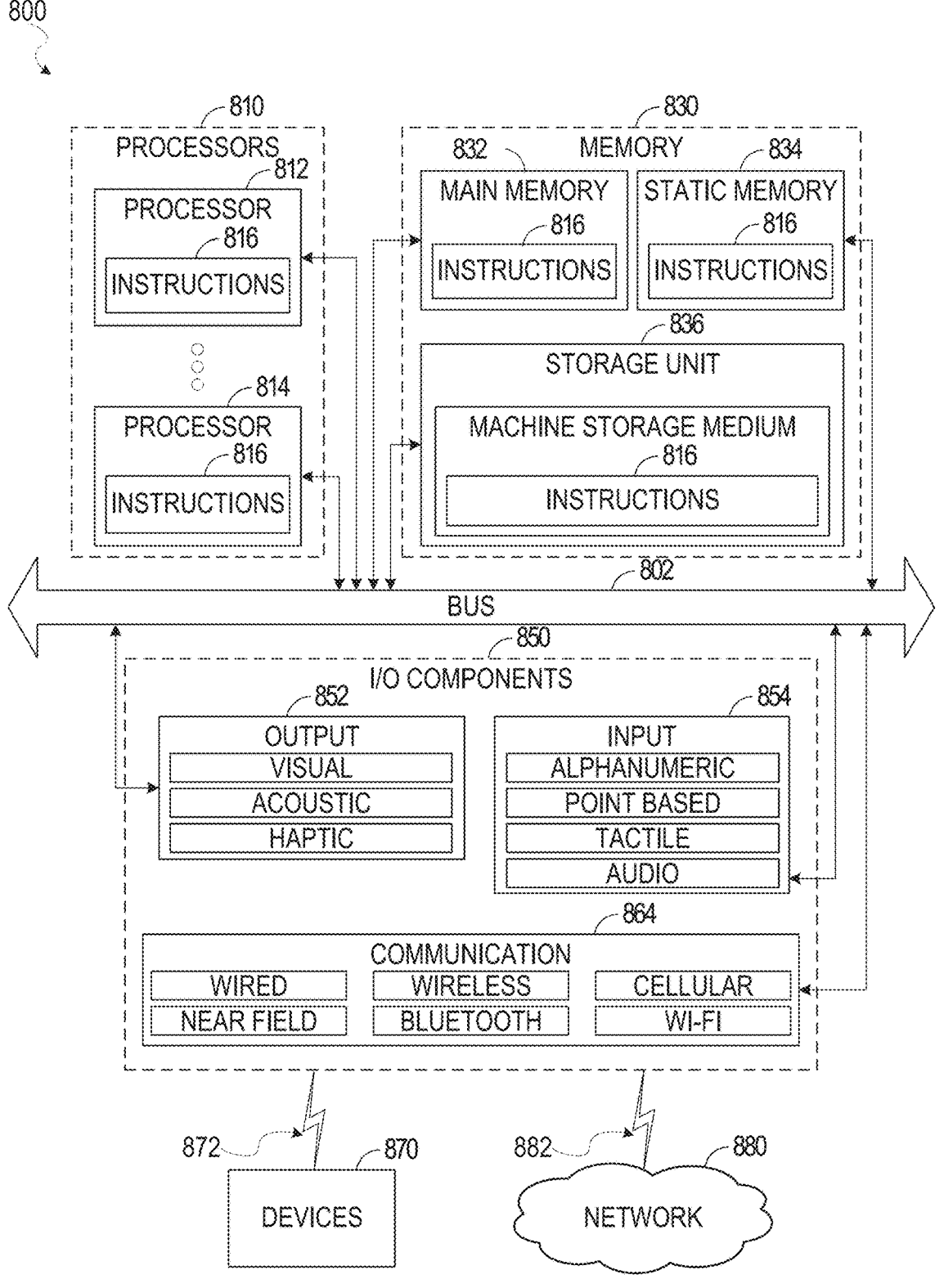
FIG. 8 illustrates a diagrammatic representation of a machine in the form of a computer system within which a set of instructions may be executed for causing the machine to perform any one or more of the methodologies discussed herein, in accordance with some examples of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of the above processes (e.g., operations 700). In this way, the instructions 816 transform a general, non-programmed machine into a particular machine 800 (e.g., the compute service manager 108 or one or more execution nodes of the execution platform 110) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The P/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/o components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 108, the execution platform 110, and the devices 870 may include any other computing device described herein as being in communication with the data platform 102.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (W-LAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling, in this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the process or operations 700 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
at least one hardware processor; and
at least one memory storing instructions that cause the at least one hardware processor to execute operations comprising:

24 allocating resources of a database system to a plurality of entities, the resources of the database system being distributed in a cloud environment;

analyzing a plurality of signals on the database system;

in response to analyzing the plurality of signals, detecting a likelihood of a service availability disruption on the database system for a first entity of the plurality of entities;

providing a graphical user interface (GUI) to the first entity that enables the first entity to define a first threshold for triggering notifications of service availability disruptions, the GUI enabling different entities of the plurality of entities to define respective thresholds used to control whether to transmit notifications about service disruptions;

receiving, via the GUI, input from the first entity that defines the first threshold;

comparing the likelihood of the service availability disruption to the first threshold; and based on determining that the likelihood, defined by the input received via the GUI from the first entity, transgresses the first threshold, notifying the first entity of the service availability disruption.

2. The system of claim 1, the operations comprising:
computing the likelihood of the service availability disruption based on the plurality of signals; and
triggering notifying the first entity in response to determining that the likelihood transgresses a threshold value.

3. The system of claim 1, wherein the service availability disruption affects the first entity while services continue to be made available to a second entity of the plurality of entities, the first entity being notified without notifying the second entity.

4. The system of claim 1, wherein the resources of the database system are allocated to the first entity on a first portion of the cloud environment, and wherein the resources of the database system are allocated to a second entity on a second portion of the cloud environment.

5. The system of claim 1, wherein the plurality of entities comprises third-party entities relative to a provider of the database system.

6. The system of claim 1, the operations comprising:
storing a job table that associates a first plurality of job features with the first entity and a second plurality of job features with a second entity; and
deriving the plurality of signals from the job table.

7. The system of claim 1, the operations comprising:
receiving input from a first computing system associated with the first entity that defines the first threshold for triggering service availability disruptions; and
receiving input from a second computing system associated with a second entity that defines a second threshold for triggering service availability disruptions.

8. The system of claim 7, wherein the second entity is notified about a service availability disruption in response to determining that another likelihood of a service availability disruption for the second entity transgresses the second threshold.

9. The system of claim 1, the operations comprising:
providing, as part of notifying the first entity about the service availability disruption, an indicator in the GUI comprising information indicating an approximate time to restore service for the first entity on the database system.

10. The system of claim 1, the operations comprising:

processing the plurality of signals by a machine learning model to predict the likelihood of the service availability disruption on the database system, the machine learning model generating a prediction indicating when the service availability disruption will start.

11. The system of claim 10, wherein the machine learning model generates outputs comprising one or more of: an identifier of a region associated with the service availability disruption, an identifier of an individual entity affected by the service availability disruption, an estimated start time of the service availability disruption, an estimated end time of the service availability disruption, a likelihood score for the service availability disruption, and indication of one or more signals of the plurality of signals that cause the service availability disruption.

12. The system of claim 10, the operations comprising training the machine learning model by performing training operations comprising:

accessing training data that associates training database signals associated with a plurality of training entities to which resources on the database system are allocated and corresponding likelihoods of service availability disruptions;

processing, by the machine learning model, a first batch of the training database signals to generate an estimated likelihood of service availability disruption;

computing a deviation between the estimated likelihood of the service availability disruption and the corresponding likelihood of the service availability disruption associated with the first batch of the training database signals; and updating parameters of the machine learning model based on the deviation.

13. The system of claim 12, the operations comprising:

generating the training database signals based on analyzing operations associated with the plurality of training entities on the database system; and computing the likelihoods of service availability disruptions for the training database signals based on application of Mahalanobis distance and principal component analysis (PCA) to the training database signals.

14. The system of claim 1, wherein the plurality of signals comprises at least one of: a number of query related incidents within a first prior time interval, a duration for which queries were delayed waiting to be resumed within a second prior time interval, a queued job percentage in a third prior time interval, a valid queries success rate, a total number of valid queries submitted by an individual entity in the second prior time interval, the duration for which queries were delayed waiting to be resumed within a fourth prior time interval, an average duration of valid queries in a fifth prior time interval, a total number of failed queries in a sixth prior time interval, a number of queries waiting to be executed in a seventh prior time interval, a number of queries waiting to be executed in an eighth prior time interval, an average duration of valid queries in a ninth prior time interval, an average duration of valid queries in a tenth prior time interval, or a total number of query related incidents visible to one or more entities.

15. The system of claim 1, the operations comprising:

receiving, from a computing device of the first entity, a request from the first entity to access service availability disruptions; and in response to receiving the request, generating the graphical user interface comprising the likelihood of the service availability disruption for presentation on the computing device of the first entity.

16. A method comprising:

allocating, by one or more processors, resources of a database system to a plurality of entities, the resources of the database system being distributed in a cloud environment;

analyzing a plurality of signals on the database system;

in response to analyzing the plurality of signals, detecting a likelihood of a service availability disruption on the database system for a first entity of the plurality of entities;

providing a graphical user interface (GUI) to the first entity that enables the first entity to define a first threshold for triggering notifications of service availability disruptions, the GUI enabling different entities of the plurality of entities to define respective thresholds used to control whether to transmit notifications about service disruptions;

receiving, via the GUI, input from the first entity that defines the first threshold;

comparing the likelihood of the service availability disruption to the first threshold; and based on determining that the likelihood, defined by the input received via the GUI from the first entity, transgresses the first threshold, notifying the first entity of the service availability disruption.

17. The method of claim 16, comprising:

computing the likelihood of the service availability disruption based on the plurality of signals; and triggering notifying the first entity in response to determining that the likelihood transgresses a threshold value.

18. The method of claim 16, wherein the service availability disruption affects the first entity while services continue to be made available to a second entity of the plurality of entities, the first entity being notified without notifying the second entity.

19. The method of claim 16, wherein the resources of the database system are allocated to the first entity on a first portion of the cloud environment, and wherein the resources of the database system are allocated to a second entity on a second portion of the cloud environment.

20. The method of claim 16, wherein the plurality of entities comprises third-party entities relative to a provider of the database system, and wherein the graphical user interface comprises:

a dashboard displaying availability related issues for the first entity, the dashboard including a time indicator specifying when data from the database system was last accessed to generate the plurality of signals;

a custom alerts setup option that, when selected by the first entity, presents a threshold definition interface enabling the first entity to define the first threshold; and a detailed information region displaying predicted service availability disruptions.

21. The method of claim 20, the detailed information region comprising:

a service region field identifying a portion of the cloud environment predicted to be impacted by the service availability disruption;

a customer identifier field identifying the first entity affected by the service availability disruption;

a start time field displaying a predicted start time of the service availability disruption;

an end time field displaying a predicted end time of the service availability disruption;

a duration field representing total duration of the service availability disruption;

a signal triggered field identifying one or more signals of the plurality of signals attributed as causes of the service availability disruption; and a suggested steps field indicating options available to the first entity for addressing the service availability disruption.

22. The method of claim 16, comprising:

receiving input from a first computing system associated with the first entity that defines a first threshold for triggering service availability disruptions; and receiving input from a second computing system associated with a second entity that defines a second threshold for triggering service availability disruptions.

23. A computer-storage medium comprising instructions that, when executed by at least one processor of a machine, configure the machine to perform operations comprising:

allocating resources of a database system to a plurality of entities, the resources of the database system being distributed in a cloud environment;

analyzing a plurality of signals on the database system;

in response to analyzing the plurality of signals, detecting a likelihood of a service availability disruption on the database system for a first entity of the plurality of entities;

providing a graphical user interface (GUI) to the first entity that enables the first entity to define a first threshold for triggering notifications of service availability disruptions, the GUI enabling different entities of the plurality of entities to define respective thresholds used to control whether to transmit notifications about service disruptions;

receiving, via the GUI, input from the first entity that defines the first threshold;

comparing the likelihood of the service availability disruption to the first threshold; and based on determining that the likelihood, defined by the input received via the GUI from the first entity, transgresses the first threshold, notifying the first entity of the service availability disruption.

24. The computer-storage medium of claim 23, the operations comprising:

computing the likelihood of the service availability disruption based on the plurality of signals; and triggering notifying the first entity in response to determining that the likelihood transgresses a threshold value.

25. The computer-storage medium of claim 23, wherein the service availability disruption affects the first entity while services continue to be made available to a second entity of the plurality of entities, the first entity being notified without notifying the second entity.

26. The computer-storage medium of claim 23, wherein the resources of the database system are allocated to the first entity on a first portion of the cloud environment, and wherein the resources of the database system are allocated to a second entity on a second portion of the cloud environment.

27. The computer-storage medium of claim 23, wherein the plurality of entities comprises third-party entities relative to a provider of the database system.

28. The computer-storage medium of claim 23, the operations comprising:

storing a job table that associates a first plurality of job features with the first entity and a second plurality of job features with a second entity; and deriving the plurality of signals from the job table.

29. The computer-storage medium of claim 23, the operations comprising:

receiving input from a first computing system associated with the first entity that defines a first threshold for triggering service availability disruptions; and receiving input from a second computing system associated with a second entity that defines a second threshold for triggering service availability disruptions.

30. The computer-storage medium of claim 29, wherein the first entity is notified in response to determining that the likelihood transgresses the first threshold, and wherein the second entity is notified about a service availability disruption in response to determining that another likelihood of a service availability disruption for the second entity transgresses the second threshold.

* * * * *